US007430520B1

(12) United States Patent
Haugen et al.

(10) Patent No.: US 7,430,520 B1
(45) Date of Patent: Sep. 30, 2008

(54) SYSTEM AND METHOD FOR DETERMINING THE LEVEL OF A AUTHENTICATION REQUIRED FOR REDEEMING A CUSTOMER'S AWARD CREDITS

(75) Inventors: Amy Haugen, Portola Valley, CA (US); Kevin Rowney, San Francisco, CA (US)

(73) Assignee: Affinion Net Patents, Inc., Norwalk, CT (US)

( * ) Notice: Subject to any disclaimer, the term of this patent is extended or adjusted under 35 U.S.C. 154(b) by 1826 days.

(21) Appl. No.: 09/637,387

(22) Filed: Aug. 11, 2000

(51) Int. Cl.
*G06Q 30/00* (2006.01)

(52) U.S. Cl. .............................. 705/14; 705/26; 705/27; 705/50; 705/51; 705/54; 705/57; 713/200; 713/216; 235/375; 235/380; 235/382; 235/383

(58) Field of Classification Search .................. 705/14, 705/26, 27, 50, 51, 54, 57; 235/375, 380, 235/382, 383
See application file for complete search history.

(56) References Cited

U.S. PATENT DOCUMENTS

| | | | |
|---|---|---|---|
| 4,750,119 A | 6/1988 | Cohen et al. | |
| 4,885,685 A | 12/1989 | Wolfberg et al. | |
| 4,932,485 A | 6/1990 | Mori | |
| 4,941,090 A | 7/1990 | McCarthy | |
| 4,949,256 A | 8/1990 | Humble | |
| 4,992,940 A | 2/1991 | Dworkin | |
| 5,025,372 A | 6/1991 | Burton et al. | |
| 5,056,019 A | 10/1991 | Schultz et al. | |
| 5,117,355 A | 5/1992 | McCarthy | |
| 5,200,889 A | 4/1993 | Mori | |
| 5,202,826 A | 4/1993 | McCarthy | |
| 5,233,514 A | 8/1993 | Ayyoubi et al. | |
| 5,287,268 A | 2/1994 | McCarthy | |
| 5,483,444 A | 1/1996 | Heintzeman et al. | |
| 5,513,102 A | 4/1996 | Auriemma | |

(Continued)

FOREIGN PATENT DOCUMENTS

EP   0 308 224 A2   3/1989

(Continued)

OTHER PUBLICATIONS

Author Anonymous, "Chase-ing After Smart Electronic Commerce", Sep. 15, 1995, Network Computing, (3 pages).

(Continued)

*Primary Examiner*—Jean Janvier
(74) *Attorney, Agent, or Firm*—Rothwell, Figg, Ernst & Manbeck, PC (57) ABSTRACT

A redemption system for use with Low Authentication Promotion (LAP) programs. The redemption system includes a method for use with a network promotion system. The network promotion system provides awards to consumers for participation in promotion programs. The method performs steps of receiving award transaction information describing awards earned by consumers for participation in promotion programs, maintaining an award history database that contains the award transaction information, receiving a request from a consumer to redeem at least a portion of the awards earned by the consumer, and determining a level of consumer authentication required from the consumer to redeem the at least a portion of the awards, wherein the level of consumer authentication is determined from the award transaction information maintained in the award history database.

14 Claims, 8 Drawing Sheets

U.S. PATENT DOCUMENTS

| | | | | |
|---|---|---|---|---|
| 5,537,314 | A | * | 7/1996 | Kanter .................. 705/14 |
| 5,687,322 | A | | 11/1997 | Deaton et al. |
| 5,689,100 | A | | 11/1997 | Carrithers et al. |
| 5,708,780 | A | | 1/1998 | Levergood et al. |
| 5,715,314 | A | | 2/1998 | Payne et al. |
| 5,734,838 | A | | 3/1998 | Robinson et al. |
| 5,761,648 | A | | 6/1998 | Golden et al. |
| 5,765,141 | A | | 6/1998 | Spector |
| 5,774,870 | A | | 6/1998 | Storey |
| 5,794,210 | A | | 8/1998 | Goldhaber et al. |
| 5,806,044 | A | | 9/1998 | Powell |
| 5,806,045 | A | | 9/1998 | Biorge et al. |
| 5,909,492 | A | | 6/1999 | Payne et al. |
| 5,937,390 | A | | 8/1999 | Hyodo |
| 5,937,391 | A | * | 8/1999 | Ikeda et al. .............. 705/14 |
| 6,003,013 | A | * | 12/1999 | Boushy et al. ........... 705/10 |
| 6,009,412 | A | * | 12/1999 | Storey .................... 705/14 |
| 6,009,415 | A | | 12/1999 | Shurling et al. |
| 6,029,141 | A | | 2/2000 | Bezos et al. |
| 6,049,778 | A | | 4/2000 | Walker et al. |
| 6,061,660 | A | | 5/2000 | Eggleston et al. |
| 6,081,788 | A | | 6/2000 | Appleman et al. |
| 6,138,911 | A | * | 10/2000 | Fredregill et al. ....... 235/383 |
| 6,141,754 | A | * | 10/2000 | Choy ....................... 726/1 |
| 6,142,371 | A | * | 11/2000 | Oneda .................... 235/380 |
| 6,148,400 | A | | 11/2000 | Arnold |
| 6,185,683 | B1 | * | 2/2001 | Ginter et al. ............ 713/176 |
| 6,243,688 | B1 | | 6/2001 | Kalina |
| 6,577,733 | B1 | * | 6/2003 | Charrin .................. 380/251 |

FOREIGN PATENT DOCUMENTS

| | | |
|---|---|---|
| GB | 308224 | 6/1930 |
| GB | 1 565 286 | 4/1980 |
| GB | 2274349 A | 7/1994 |
| GB | 2 306 740 A | 5/1997 |
| GB | 2 315 351 A | 1/1998 |
| WO | WO 96/29668 A1 | 9/1996 |
| WO | WO 97/22058 A1 | 6/1997 |

OTHER PUBLICATIONS

Jackie Cohen, "Merchant Server Market Heats Up", Feb. 1, 1997, Bank Technology News (10 pages).

Author Anonymous, "Public-Key Algorithms", Chapter 19, pp. 461-502 (1996).

Eric Brown, "No Small Change", Micropa, New Media (Jun. 23, 1997) pp. 30-37.

Loretta E. Kaufman, "Taking Inventory of Your Frequent-Flier Miles", Money (Apr. 1995) (one page).

Gary H. Anthes, "MCI Cuts Ribbon on digital Mall," Computerworld, p. 15 (Nov. 28, 1994). (one page).

Karen Rodriguez, "MCI Rolls out Internet Electronic Commerce," Infoworld, p. 12 (Apr. 3, 1995) (one page).

Hoffman et al., "Amex Travels the Net," Computerworld, p. 63 (Feb. 27, 1995) (one page).

Norman Hirsch, "Using the Internet to Reach Clients," American Printer, p. 64, date unknown (one page).

Author Anonymous, "Give Cyber-Ready Consumers the Once Over", Interactive Marketing News, Copyright Phillips Business Information Corporation- Jun. 23, 1995, V.2, No. 13 (two pages).

\* cited by examiner

| 400 ↗ | | | | | |
|---|---|---|---|---|---|
| CONSUMER I.D. 402 | TRANSACTION TYPE 404 | AUTHENTICATION 406 | POINTS EARNED 408 | DATE EARNED 410 | DATE EXPIRED 412 |
| CONSUMER A | SIGN-UP<br>SURVEY — 420<br>REFERRAL<br>PURCHASE — 422 | LOW<br>LOW<br>LOW<br>HIGH | 100<br>100<br>100<br>5000 | 1/1/99<br>3/5/99<br>7/9/99<br>11/22/99 | 1/1/2000<br>1/1/2000<br>1/1/2000<br>1/1/2002 |
| CONSUMER B | SIGN-UP<br>SURVEY<br>REFERRAL<br>REFERRAL | LOW<br>LOW<br>LOW<br>LOW | 100<br>100<br>100<br>100 | 2/1/99<br>4/5/99<br>6/9/99<br>12/22/99 | 1/1/2000<br>1/1/2000<br>1/1/2000<br>6/1/2000 |
| CONSUMER C | SIGN-UP<br>REFERRAL | LOW<br>LOW | 100<br>100 | 7/1/99<br>8/5/99 | 1/1/2000<br>1/1/2000 |

SYSTEM AND METHOD FOR DETERMINING THE LEVEL OF A AUTHENTICATION REQUIRED FOR REDEEMING A CUSTOMER'S AWARD CREDITS

FIELD OF THE INVENTION

This application relates generally to network promotion systems, and more particularly, to a redemption system for use with a promotion system to provide redemption authentication, control and security.

BACKGROUND OF THE INVENTION

In general, merchants (e.g. proprietors of goods and services) participate in incentive programs to entice customers or consumers to purchase products or services; and website operators employ incentives schemes to incent consumers to visit their websites more frequently. Typically, merchants want to reward customers for purchasing merchandise and thereby fulfill the goal of conferring the maximum benefit on the customer while minimizing the merchant's overhead and cost.

One type of incentive program confers a single product, service or benefit to the customer as an award. The frequent flyer mileage program is an example of an incentive program that confers a single predefined benefit to the customer. In one frequent flyer mileage program, credit cards associated with airlines permit customers to receive frequent flyer miles in exchange for the customer's use of the credit cards. The frequent flyer incentive programs typically award the customer one frequent flyer mile for each dollar spent using the credit cards. The customer subsequently redeems the frequent flyer miles earned for airline tickets or upgrades in accordance with the rules of the frequent flyer mileage program.

In another type of incentive program, the customer may receive incentive "points" or stamps based on the value of a purchase. For example, if a customer purchases a $1,000 item, the customer may receive 1,000 points. For this type of incentive program the customer is also provided with a way to redeem the points. Typically, the customer may redeem the points by selecting items, such as merchandise or services, from a catalog.

Although the catalog provides the customer with a greater selection than the predetermined benefit program, the customer's benefit is constrained to items in the catalog. A merchant, when setting up the incentive program, must select how the customer will receive benefit. For example, the merchant may set up the incentive program with a vendor or supplier of the value, such as in a frequent flyer mileage program, so that the customer receives a pre-determined benefit (e.g., frequent flyer miles) after the customer purchases the merchant's product. Alternatively, the merchant may develop a catalog of merchandise for which the customer may redeem items based on the amount awarded. Accordingly, because the merchant desired to confer the maximum benefit on the customer, it is desirable, when implementing an incentive program, to provide the customer with a wide array of choices while minimizing the overhead required by the merchant to implement the incentive program.

As outlined above, incentive programs are currently used for credit card transactions, as well as other customer transactions performed at a merchant's store. However, data networks, such as the Internet, provide numerous opportunities for conducting electronic transactions, including transactions relating to electronic commerce. The potential for commerce over the Internet is great because a user, through the use of a computer connected to the Internet, may connect up with a huge number of merchants. Alternatively, the Internet allows merchants to connect up with a huge number of consumers. Because incentive programs are an effective way of motivating customers to purchase goods or services, it is desirable to implement an incentive program for use with the Internet.

An incentive program that gives awards to consumers for making a purchase is referred to as High Authentication Promotion (HAP) program. It is a HAP program because a consumer must provide detailed information about themselves to satisfy a high level of authentication in order to complete the purchase and earn the award. For example, the consumer may be required to provided their name, address and credit card number to complete the purchase. Another type of incentive program that is suitable for use with the Internet is referred to as a Low Authentication Promotion (LAP) program. The LAP program enables consumers to earn awards for activities that do not require the user to provide the same level of authentication normally found in a HAP. To participate in a LAP program, users may need to provide only minimal information about themselves, such as an email address. For example, a LAP program might award points to a participant for signing up for a promotional offer, clicking on a hyperlink, clicking on an image, referring-a-friend, filling out surveys, or downloading software. The points earned from such activities are associated with the participant's email address. Thus, it is possible for LAP programs to have very large consumer participation, since consumers are not required to make a monetary transaction or provide detailed information about themselves to participate.

As a result of the low threshold for participation and the potential for participation by large numbers of consumers, LAP programs are vulnerable to problems relating to over-participation and breaches of security. For example, if unexpectedly large numbers of consumers decide to participate in a particular LAP program, the value conferred by the program may exceed a desired maximum. With regards to security, since the threshold for participation is low, LAP programs may incur large losses in a relatively short time period due to fraud, misrepresentation or other security breaches. For example, one dishonest consumer can launch a type of automated program, referred to as a "bot", that completes the requirements of a LAP program numerous times and provides different email addresses to which the points earned are associated. By consolidating the points associated with all the email accounts, the dishonest consumer will have received substantial value from the LAP program, albeit through fraudulent means.

However, since it is desirable to provide an enjoyable experience to consumers that participate in LAP programs, it is important that the mechanisms provided to implement the program do not overburden the consumers. For example, a LAP program that requires consumers to repeatedly provide detailed information to identify themselves would most likely overburden the consumer and result in low participation.

SUMMARY OF THE INVENTION

The present invention includes a redemption system for use by on-line Low Authentication Promotion (LAP) programs. The redemption system monitors program participation and provides one or more control mechanisms that can be used to protect against excessive program participation or losses due to security breaches. For example, excessive participation may be detected by monitoring the speed or "velocity" at which program benefits are conferred. Security breaches can also increase the velocity of an incentive program. For example, an increase in velocity may be detected if a small number of consumers use fraudulent means to obtain excessive program benefits in a short amount of time. Thus, included in the redemption system are one or more control mechanisms to slow down the operation of a LAP program if its velocity becomes higher than desired or to shut down the LAP program if security breaches are detected.

The redemption system provides a transaction history database that tracks the activity of program participants. For example, the history database tracks whether a particular consumer has participated solely in LAP programs, or whether that consumer has also participated in high authentication promotion (HAP) programs, such as when making a product purchase using a credit card. When the consumer attempts to redeem awards issued by a LAP program, the redemption system uses the information in the transaction history database to determine the level of authentication required from the consumer for the redemption. For example, if the consumer has participated in only LAP programs, then a high level of authentication will be required from the consumer to redeem the awards. However, if the consumer has participated in both LAP and HAP programs, the consumer need only satisfy low authentication requirements to redeem the awards, since high authentication information has already been provided. Thus, the redemption system operates to provide a more friendly environment to consumers, since high authentication information is not repeatedly required from the consumer. The system also provides a level a security, since participants of only LAP programs are required to provide a high level of authentication to redeem awards. Therefore, program losses due to dishonest participants (using bots for example) can be minimized.

In one embodiment of the invention a method for providing a redemption system for use with a network promotion system is provided. The network promotion system provides awards to consumers for participation in promotion programs. The method performs steps of receiving award transaction information describing awards earned by consumers for participation in promotion programs, maintaining an award history database that contains the award transaction information, receiving a request from a consumer to redeem at least a portion of the awards earned by the consumer, and determining a level of consumer authentication required from the consumer to redeem the at least a portion of the awards, wherein the level of consumer authentication is determined from the award transaction information maintained in the award history database.

DESCRIPTION OF THE SPECIFIC EMBODIMENTS

Figure 1:
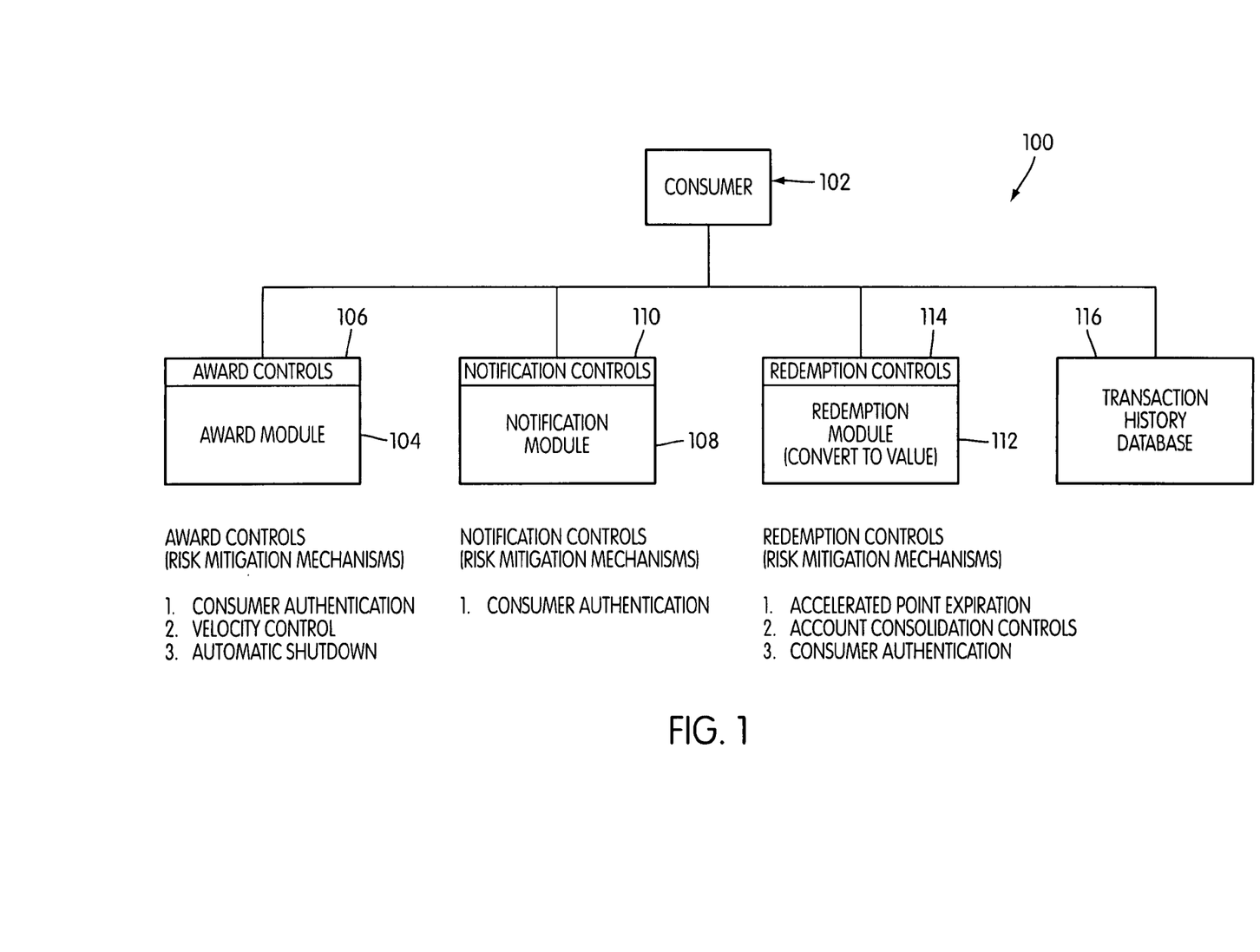
FIG. 1 shows a diagram of promotion system elements constructed in accordance with the present invention.

FIG. 1 shows a diagram of a promotion system 100 comprising elements constructed in accordance with one embodiment of the present invention. The promotion system 100 allows a consumer 102 to participate in incentive programs, such as LAP programs, to receive and redeem awards. Included with each of the elements are control mechanisms that can be used to monitor and control the operation of the promotion system. The elements of the promotion system 100 may be located at a particular merchant's computer system and/or distributed or replicated at various locations throughout a data network. The promotion system 100 is suitable for use in a networked environment, such as on the Internet, or in a non-networked environment that uses point to point communication mechanisms.

One element of the promotion system 100 is an award module 104. The award module 104 comprises a processor running software (program code) that operates to allow the consumer 102 to earn awards, for example, awards based on specific LAP activity, such as signing-up for a program. Included at the award module 104 are award controls 106 comprising hardware and/or software that operate to provide risk mitigation mechanisms to monitor and control the operation of the award module 104. For example, the risk mitigation mechanisms might include consumer authentication (CA) mechanisms that can authenticate participating consumers, program velocity (VEL) controls that can detect program velocity parameters and adjust the operation of the promotion system 100 accordingly, and automatic shutdown (SHUT) capability that can detect security breaches and shutdown the promotion system 100.

Another element of the promotion system 100 is a notification module 108. The notification module 108 comprises a processor running software (program code) that operates to notify the consumer 102 regarding the status of accumulated program benefits. For example, the consumer may interact with the notification module 108 to check to see how many award points he/she has earned. It is also possible that the notification module 108 sends information to the consumer, such as monthly statements or award notifications shortly before an award is to expire. Included at the notification module 108 are notification controls 110. The notification controls 110 include CA mechanisms that operate to provide secure access to consumer accounts.

The third element of the promotion system 100 is a redemption module 112. The redemption module 112 comprises a processor running software (program code) that operates to allow the consumer 102 to redeem awards. For example, the consumer may interact with the redemption module 112 to convert an award to value by exchanging award points for selected goods or services. Included at the redemption module are redemption controls 114. The redemption controls 114 provide risk mitigation mechanisms, such as accelerate point expiration (ACC) to adjust how fast earned points expire, an account consolidation mechanism (CTL) to monitor account consolidations, and CA mechanisms that operate to authenticate consumers attempting to redeem awards.

The fourth element of the promotion system 100 is a transaction history database 116. The transaction history database stores promotion transactions for all registered consumers. For example, if a consumer participates in five promotions over the course of one year, information pertaining to those five promotions is stored in the transaction history database 116. Information in the transaction history database is used by the elements of the promotion system to determine various operating parameters and to determine the level of consumer authentication required to redeem awards.

Control Mechanisms

The control mechanisms included in the promotion system 100 protect the operation of LAP programs from excessive participation or losses that may occur from fraud or misrepresentation. A detailed description of the control mechanisms are provided herein in the following sections. Although the control mechanisms are organized as front end controls and back end controls, it is possible that other organizations of the control mechanisms may be used without deviating from the scope of the present invention.

1. Front End Controls

Front end controls are used to monitor and control program activity of the award module 104. The front end controls allow the originator of the promotion to set operating parameters based on marketing and fraud mitigation concerns and to take specific action if the program operation exceeds the set parameters.

Operating Parameters

The operating parameters are used to set operation of the promotion, for example, with regards to marketing or business concerns. For example, it might be desirable to start and stop a promotion on specific dates. It may also be desirable to limit the total value conferred to consumers by the promotion and to limit the value conferred to any one consumer. Therefore, the following operating parameters might be specified by the promotion originator, however, the presented list is not intended to be a complete list as there may exist a large range of possible operating parameters.

Limits on the number of points a consumer can earn in a day.
Limits on the number of points a consumer can earn in a lifetime.
Limits on the overall number of points that the promotion can award in a day.
Limits on overall number of points that the promotion can award over the life of the promotion.
Promotion start and end dates.

Fraud Mitigation Parameters

The fraud mitigation parameters are preferably selected such that the promotion system operates with certain security constraints. For example, it is desirable to prevent a small number of consumers from obtaining additional rewards by using fraudulent means. Fraud mitigation parameters include.

Limits on the velocity of awards awarded to an individual person.
Limits on the number of points that the promotion can award based on the originating IP address.
Limits on the number of points awarded based on recognition of specific participation patterns.

2. Back End Controls

Back end controls are used to monitor and control program activity at the notification module 108 and the redemption module 112. The back end controls allow the sue of operating parameters based on redemption or security concerns and allow specific action if the promotion program operation exceeds the set parameters.

Data Integrity Checks

The data integrity checks are used to validate the authenticity of members and to provide the following functions.

Distinguish and track the level of authentication provided by members by storing such information in the transaction history database.
Members that have provided only a low level of authentication are flagged as "low authentication" and "no redeem", which triggers authenticity checks and back end redemption controls. This also aids in reporting and targeting marketing objectives.

Redemption Parameters

Redemption parameters are used to monitor and control redemption activity. The redemption parameters are used to perform the following functions.

Account consolidation controls are provided to ensure that multiple (and potentially fraudulent) consumer accounts are not redeemed to the same frequent flier number, and that credit card authorization controls are used to ensure that consumers do not use the same credit card for authentication across multiple (and potentially fraudulent) consumer accounts.
Ensure that the promotion rules are upheld during award redemption or account consolidation, and that award points are not redeemed by multiple false identities into a single account.
Provide automated features that can detect fraudulent/redundant transactions and remove them without extensive human intervention.

Exemplary Implementation

Figure 2:
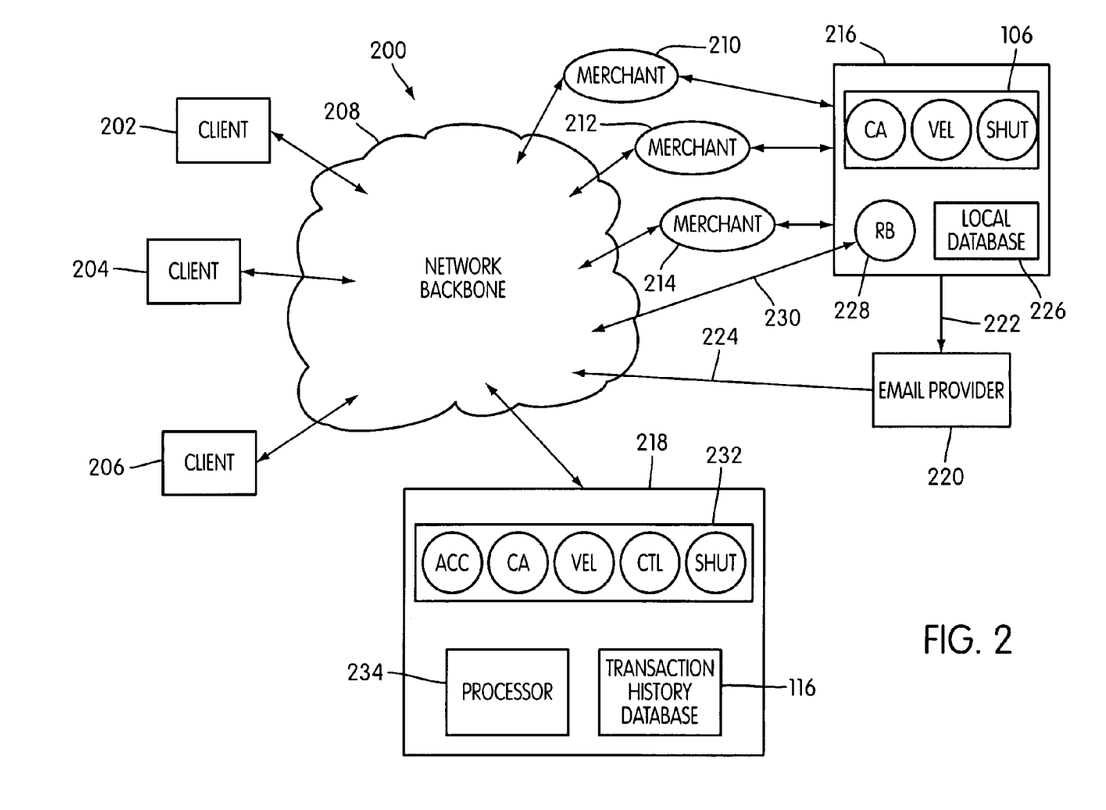
FIG. 2 shows a portion of a data network including a promotion system constructed in accordance with the present invention.

FIG. 2 shows a data network 200 that includes the elements of the promotion system 100 of FIG. 1. The network 200 includes client systems 202, 204 and 206 that couple to a network backbone 208. Three merchant systems 210, 212 and 214 couple to the network backbone 208 and to an application service provider (ASP) 216. A promotion server 218 and an email provider 220 also couple to the network backbone 208.

The client systems comprise hardware and/or software that allow consumers to interact with other entities connected to the network backbone 208. For example, the client systems may be desktop computers running browser software that allows a consumer to search for information available over the network 208. The merchant systems 210, 212, 214 include hardware and/or software to provide, for example, a website that includes information regarding products or services that are available at each respective merchant. Thus, consumers utilizing the client systems can search for information relating to specific products or services, locate one or more selected merchant systems offering such products or services, and contact the selected merchant systems to view their respective websites and ultimately purchase the desired product or service.

The promotion server 218 provides promotion programs that the merchants and consumers can register to participate in. For example, the promotion server provides LAP programs that allow consumers to earn points redeemable at selected merchants. To implement the promotion programs, the promotion server 218 uses the ASP 216 to distribute information to consumers regarding available promotions. For example, the ASP 216 distributes content in the form of banner ads that are displayable at the merchant's websites. The banner ads contain clickable links that consumers can activate to indicate their intention to participate in a selected promotion. The clickable links may redirect the consumer to the ASP system to participate in the promotion. Thus, the ASP 216 operates to distribute promotional content to the merchants thereby allowing consumers to visit a merchant's website and select, via a clickable link, a promotion in which to participate. It is not necessary that the merchant know about the links contained in a promotion. The merchant simply offers the promotion to consumers that visit the merchant's website, thereby encouraging consumers to visit the website and hopefully purchase the merchant's products or to simply visit the site more frequently.

The ASP 216 may also distribute promotional content to consumers via the email provider 220. For example, the ASP sends promotional information to the email provider via path 222. The email provider then sends email directly to the client systems, via a connection 224 to the network 208, so that the email may be received by the consumers. The email contains clickable links that allow consumers to participate in the promotions in the same way as when using the banner ads at the merchant websites. If a consumer clicks on a link provided in the email, the client system is redirected to the ASP where the consumer learns more about the available promotion and how to participate.

The ASP 216 provides the functions of the award module 104 shown in FIG. 1. The ASP includes the front end award controls 106, such as velocity controls and consumer authentication. The ASP also includes a local database 226 that stores information about the promotional content offered by the ASP. A reward broker 228 included at the ASP operates to interact with consumers and transfers information about points earned by consumers to the promotion server 218, via path 230. Detailed information about the reward broker 228 will not be presented in this document, since such detail is not necessary to the understanding of the present invention. Virtually any reward broker that operates to interact with consumers to award points for consumer participation is suitable for use with the present invention. For example, once the award broker determines points to award to a consumer for participation in a promotion program, the reward broker transmits the point information to the promotion server 218 either directly or via a network connection, such at that shown by path 230.

The promotion server 218 includes back-end control mechanisms 232, a transaction processor 234 and the transaction history database 116. The promotion server 218 operates to provide the functions of the notification module 108 and the redemption module 112. Thus, the control mechanisms 232 operate to provide the notification controls 110 and the redemption controls 114 described above. Therefore, the data network 200 including the promotion system 100 operates to provide consumers the ability to participate in programs, earn award points at the ASP 216, and redeem points at the promotion server 218.

FIG. 2 depicts one embodiment of a promotion system in accordance with the present invention, however, other similar embodiments are possible without deviating from the scope of the invention. For example, the ASP 216 system may include a Notification module 108 or a Redemption module 112. Thus, it is possible that the elements of the promotion system included in the present invention be distributed in one or more variations from that shown in FIG. 2 without deviating from the scope of the invention.

Figure 3:
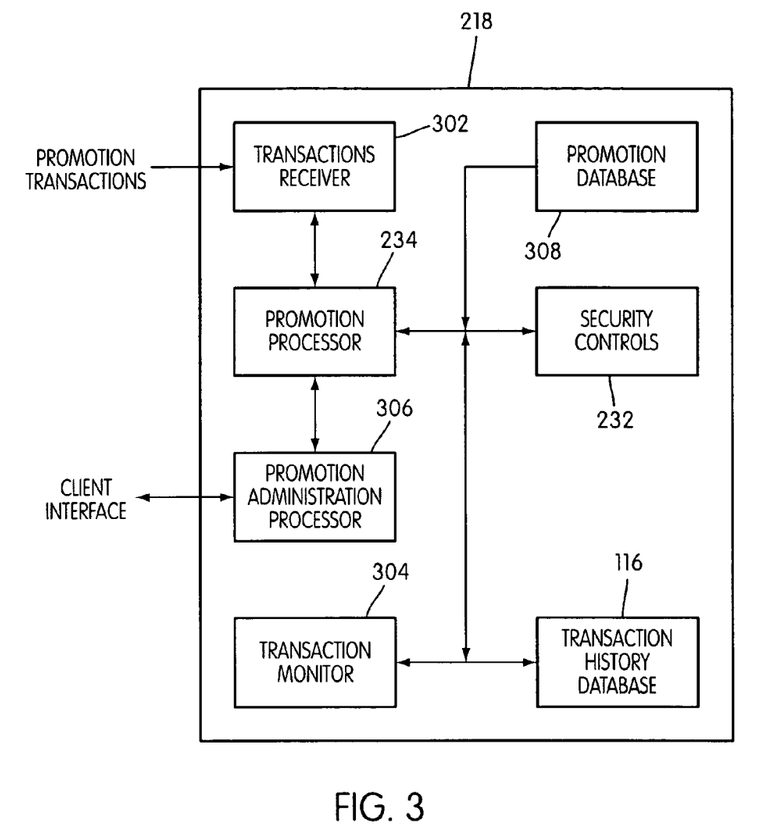
FIG. 3 shows a detailed diagram of a promotion server apparatus constructed in accordance with the present invention.

FIG. 3 shows a detailed diagram of the promotion server 218 constructed in accordance with the present invention. The promotion server 218 includes a transaction receiver 302, the promotion processor 234, the security controls 232, the transaction history database 116, a transaction monitor 304, a promotion database 308 and a promotion administration processor 306.

The transactions receiver 302 receives promotion transactions from the ASP 216 pertaining to the promotion participation and points awarded to consumers. The promotion processor 234 processes this information and stores it in the transaction history database 116. The promotion administration processor 306 interfaces with clients to allow promotion notifications to be sent and client redemption requests to be received. The security controls 232 are used by the promotion administration processor to implement back-end security controls. The transaction monitor 304 processes received transactions to determine such parameters as velocity parameters for use by both the promotion processor 234 and the administration processor 306.

Each of the security and control mechanisms will now be described in detail and with reference to their implementation in the promotion system 100 as shown in FIG. 2.

Consumer Authentication

Consumer authentication (CA) is used at the ASP 216 and at the promotion server 218 to provide measures that verify the consumer's identity. Consumers that have earned points through low authentication activities may be considered high risk, since the strength of the authenticity check for the consumer in order to participate in low authentication activities in low (possibly zero). For example, a consumer may participate in a LAP program by simply providing an email address, which may in fact be fraudulent. These consumers can later be "authenticated" by requiring them to submit a unique credit card number to the promotion system at a later time after the award has been made, thus allowing risk mitigation to take place without interfering with the marketing objectives of the promotion. For example, the ASP 216 receives a request from a consumer to participate in a low authentication promotion. The ASP can do a basic authenticity check, like verifying whether the initiator of the request has previously participated in the promotion by matching the received information with information contained in the local database 226. If the initiator of the request is not found in the local database 226, the ASP can allow the consumer to participate by requesting that the consumer simply provide an email address. This reflects a low level of authentication. The consumer may be required to provide a higher level of authentication when an attempt is made to redeem any points awarded. The high level of authentication can occur, for example, by requesting credit card information from the consumer that can be verified using a third party resource, such as a credit card verification service. Other forms of consumer authentication can be used beyond just credit cards, including (but not limited to) address verification systems, social security number verification, driver license numbers verification, voice recognition, and/or public key cryptography checks.

Velocity Controls

Velocity controls (VEL) are used at the ASP 216 and the promotion server 218 as a mechanism to control the velocity of a promotion program. For example, at the promotion server 218, the transaction monitor 304 measures the type, number and rate of transactions processed by the promotion processor 234. Promotion parameters stored at the promotion database 308 are used by the promotion processor 234 to determine if a selected operating parameter, such as the number of promotion transactions per hour, is being exceeded. If so, the promotion processor 234 takes responsive action, such as increasing the response time for each transaction request by inserting time delays in the promotion processing. For example, a consumer contacts the ASP in an attempt to participate in a promotion to earn award points. The velocity of the promotion is determined at the ASP and compared to parameters stored at the ASP that represent acceptable velocity for the particular promotion. If the velocity of the promotion exceeds acceptable parameters, then time delays are inserted in the ASP processing, so that a time delay is incurred before the ASP responds to the consumers request. For example, a delay in the range of 1-10 seconds may be inserted in the ASP processing before responding to the consumer's request to participate in the promotion. The inserted time delay has the effect of slowing down the velocity of the promotion program. Longer delays are also possible depending on the circumstances of the promotion program. Such velocity controls can also be used to control fraud beyond just delaying the response time, for example, by stopping the promotion altogether as discussed in the next section.

Auto Shut-Down Controls

Automatic shutdown controls (SHUT) are used at the ASP 216 and the promotion server 218 to provide a way to shut down a promotion based on selected conditions. For example, if the promotion's velocity parameters are exceeded or if abnormal transaction behavior is detected, the automatic shutdown controls react by stopping operation of the promotion. The automatic shutdown controls can also be triggered off events such as, promotion expiration, all points awarded, or detection of unusual frequency, pattern matches, or repeat transactions. For example, the promotion processor 234 reads the total number of points to be awarded for a promotion from the promotion parameter database 308. The promotion processor 234 also receives information about the actual points awarded from the transaction monitor 304. The promotion processor 234 then determines from the received point information whether all available points have been awarded, and if so, shuts down the promotion by refusing to process any more promotion requests. In one embodiment, the auto shut down controls shuts down the promotion in a fashion designed to be barely perceptible to consumers so that the marketing objectives of the promotion are not compromised. This shut down mechanism entails removing (via the ASP 216) all promotional content off of the sites where it is displayed (i.e. the merchants; e.g.: 210) in real time so that new consumers that arrive at those sites do not even know that the promotion existed in the first place.

Account Consolidation Controls

Account consolidation controls (CTL) are used at the promotion server 218 to provide a way to prevent consumers from consolidating multiple accounts that may have been fraudulently established. For example, if the a consumer uses a "bot" to establish 100 accounts each containing 100 award points, the consumer may try to consolidate these accounts into one account having a point value of 10,000. The consumer would then try to redeem the 10,000 points for value. This situation may happen if a LAP program offers points that can be earned by a consumer who only needs to provide an email address to satisfy authentication requirements.

The CTL controls can be activated whenever an account consolidation is requested by an consumer. In one embodiment, the CTL controls operate to require the consumer to provide additional authentication to consolidate accounts. For example, the CTL controls may require the consumer to provide a high level of authentication for every account to be considered. Thus, the consumer may have to provide valid credit card information for each account. In another embodiment, the CTL controls operate to required that each account be associated with a different valid credit card. Thus, the CTL controls provide a substantial authentication barrier to consumers desiring to use fraudulent means to acquire award points.

Transaction History Database

Figure 4:
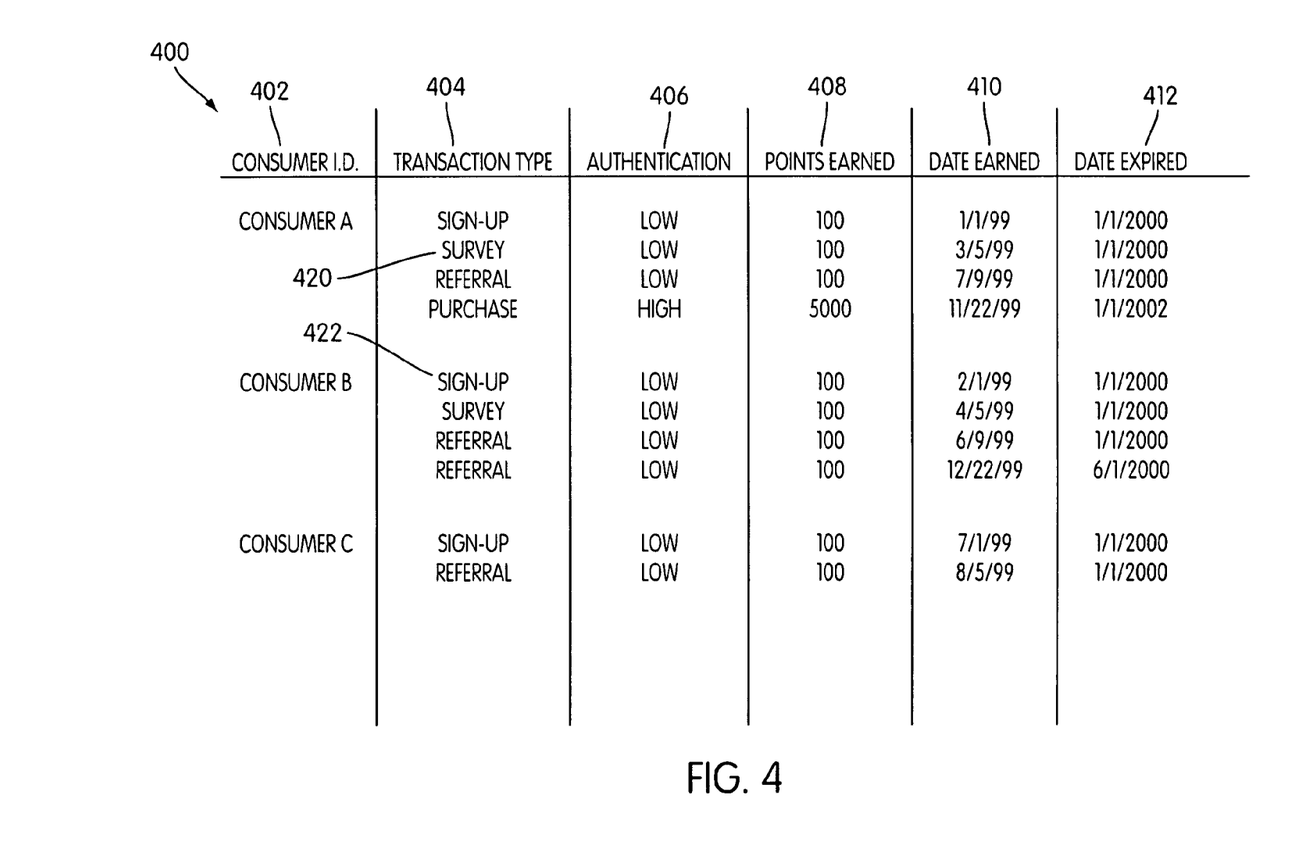
FIG. 4 shows a transaction history database structure for storing consumer promotion transactions.

FIG. 4 shows an exemplary data structure 400 for the transaction history database 116 constructed in accordance with the present invention. The database 116 is used to store information that can be used by the promotion processor to determine information about promotion transactions in which consumers have participated. The database 116 includes a consumer identification column 402 that includes information about consumers registered with the promotion system.

A transaction type column 404 shows the type of transactions each consumer has participated in. For example, consumer A has participated in four transaction types including, sign-up, survey, referral and purchase. Associated with each transaction type is an authentication column 406 that provides the level of authentication provided by the consumer to participate in the respective transaction. For example, consumer A provided low level authentication to participate in the survey transaction 420.

A points column 408 shows the points each consumer earned for participating in each type of transaction and a date earned column 410 and date expired column 412 show when the points were earned and when they expire. For example, consumer B earned 100 points for a sign-up transaction 422 performed on Feb. 1, 1999 and these points are due to expire on Jan. 1, 2000.

Exemplary System Operation

FIGS. 5, 6, 7 and 8 shows methods of operating a promotion system in accordance with the present invention.

Figure 5:
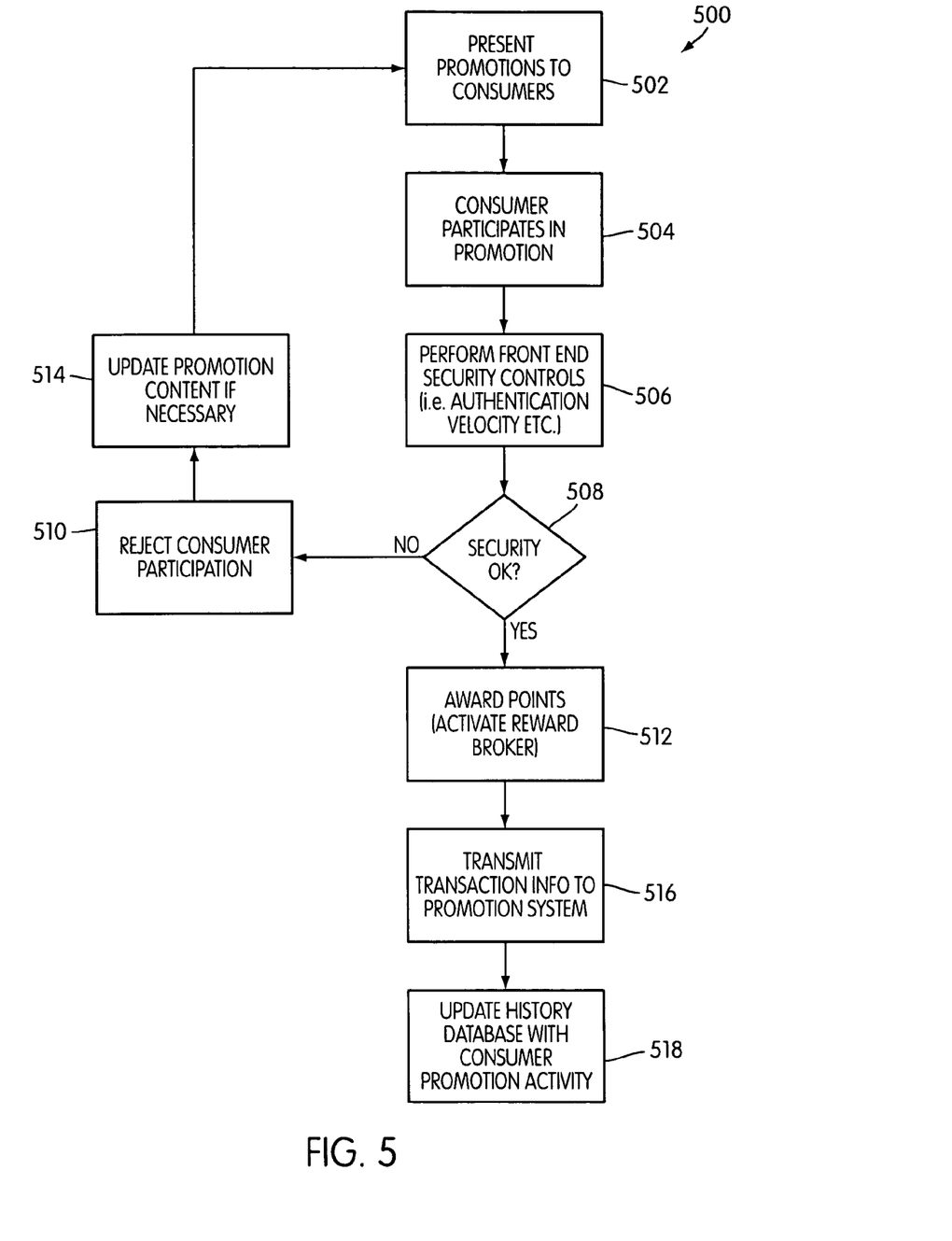
FIG. 5 shows a method for providing awards to consumers and updating a transaction history database in accordance with the present invention.

FIG. 5 shows a method 500 of operation wherein a consumer participates in a promotion program to earn award points. The method begins at block 502 by presenting available promotion programs to consumers. For example, a consumer logs into a merchant website and views a banner advertising an available promotion. The banner contains a link to redirect the consumer to an ASP where the consumer can participate in the promotion.

At block 504, the consumer participates in the promotion to earn award points. For example, the consumer clinks on the link in the banner ad and is redirected to the ASP, where the consumer completes a survey to earn award points.

At block 506, front end security controls are performed. For example, a velocity check is performed to verify that the designated promotion velocity has not been exceeded. A consumer authentication is performed to verify that the consumer has not already participated in the promotion. In the case of a promotion associated with a survey, the level of authentication may be low, so that the consumer need only provide a valid email address. If the promotion velocity has been exceeded, time delays may be inserted to slow down responses to the consumer, thereby slowing down the overall promotion velocity.

At block 508, a test is performed to determine if the requirements of the security and control mechanisms have been satisfied. If not, the method proceeds to block 510 where the consumer participation is rejected. For example, the consumer is notified that certain requirements for participation have not been satisfied. However, if the requirements have been satisfied at block 508, the method proceeds to block 512.

If the consumer is rejected at block 510, the method proceeds to block 514 where the content of the promotion is updated if need be. For example, if a promotion shut down is required, the promotion advertising content will be removed from merchant websites, so that consumers can no longer participate in the program.

At block 512, assuming the security check at block 508 was OK, the consumer completes the earning activity and is awarded points for participation in the promotion. For example, a reward broker may be activated to provide the award and send a confirming message to the consumer.

At block 516, information regarding the transaction is provided to the promotion system. Thus, the promotion system is informed of the identity of the consumer, the type of promotion, the points awarded and the level of authentication provided by the consumer.

At block 518, the promotion system updates a transaction history database with information about the transaction. The history database is used to keep track of all promotion transaction activity. For example, the data structure 400 is an example of the structure of the transaction history database that may be used to store promotion transaction information. The transaction information remains in the transaction history database for access at other times as necessary, for example, during a point redemption process. Thus, the method 500 is suitable for use to award points to consumers based on their participation in promotion programs in accordance with one embodiment of the present invention.

Figure 6:
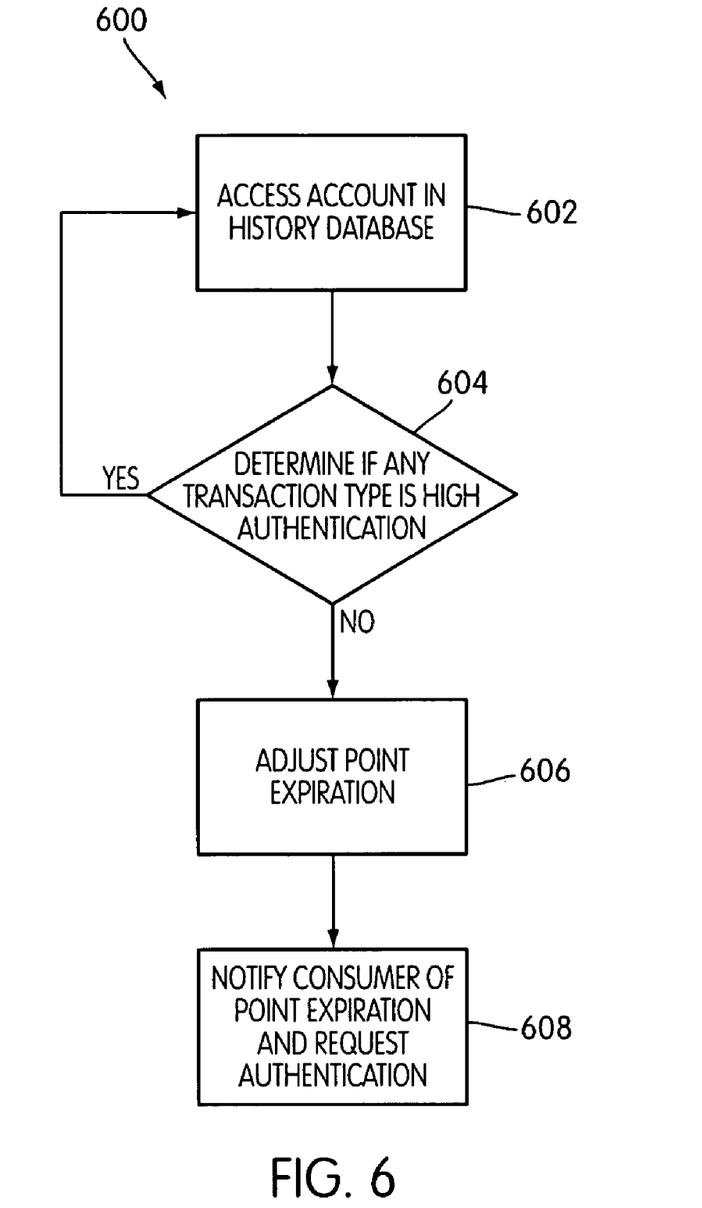
FIG. 6 shows a method for providing notification to consumers pertaining to consumer award accounts.

FIG. 6 shows a method 600 for notifying consumers regarding award account status. It will be assumed that there is at least one consumer transaction record in the transaction history database.

At block 602, a consumer account in the transaction history database is reviewed to determine conditions such as, award points about to expire. At block 604, a determination is made whether the consumer has any high authentication transactions. If so, the method proceeds to block 602 where another consumer account is accessed for review.

The method proceeds to block 606 if it is determined that the consumer has no high authentication transaction in the transaction history. At block 606, the expiration of award points can be adjusted if it is desirable to encourage the consumer to provide a high level of authentication. For example, a high level of authentication requires the consumer to provide detailed information about the consumer to the promotion system. This information can be used for marketing or other purposes, such as directing additional promotions to the consumer. Thus, it is desirable to encourage consumers to provide a high level of authentication.

At block 608, the consumer is notified regarding award points that are about to expire. The consumer may also receive a request to provide high level authentication. The consumer may be rewarded for doing so, for example, the expiration date of the consumers awards may be extended. Thus, the method 600 provides a way to notify consumers about award account status and to encourage consumers to provide high level authentication to the promotion system.

Figure 7:
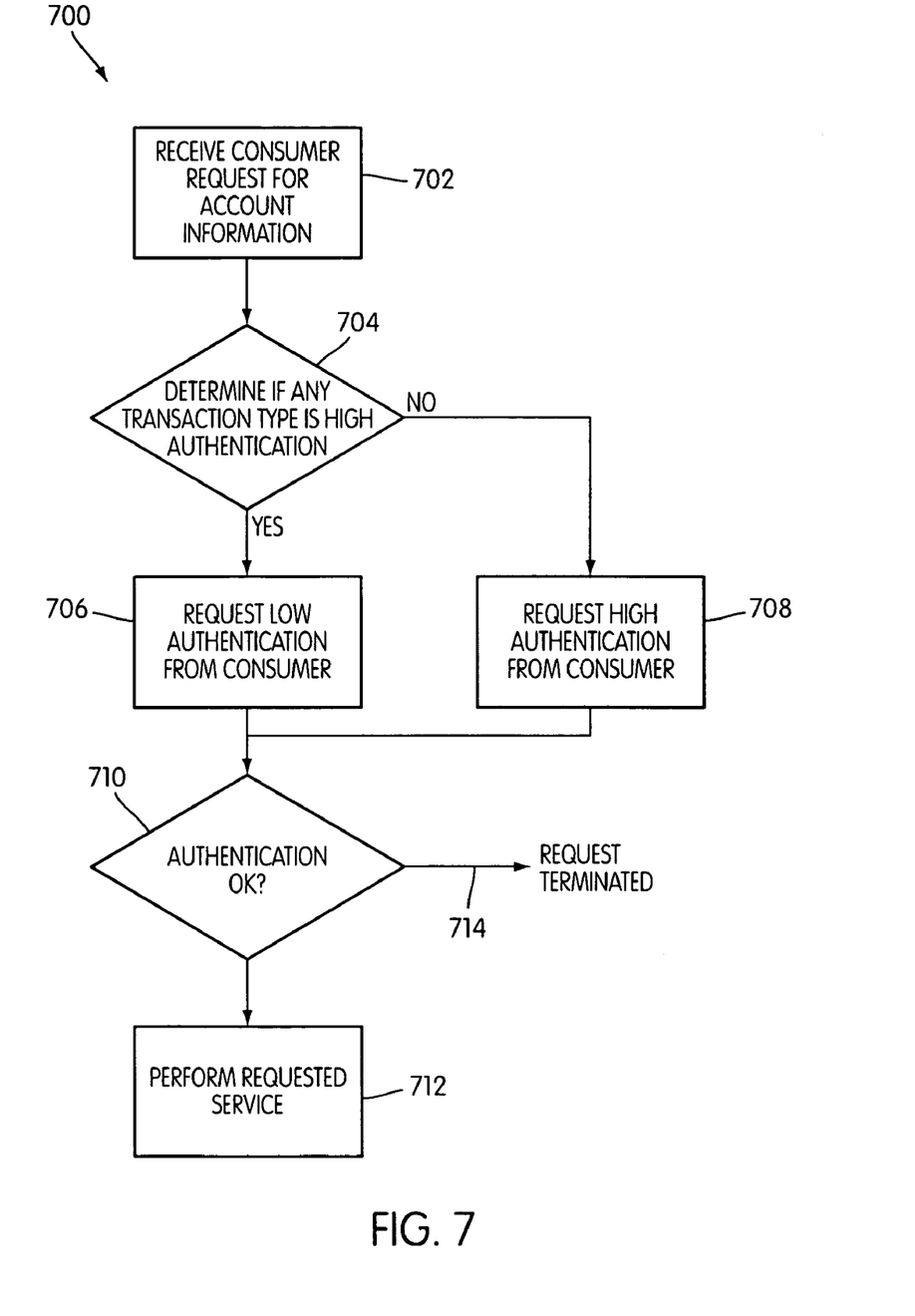
FIG. 7 shows a method for providing account access to consumers.

FIG. 7 shows a method 700 that allows a consumer to request award account services from a promotion system, such as requesting an award account balance.

At block 702, a request from a consumer is received by the promotion system. The request includes consumer identification and/or consumer account numbers. At block 704, a review of the consumers transaction history is used to determine if the consumer has made any high authentication transactions.

The method proceed to block 706 if the consumer has made high authentication transactions or the method proceeds to block 708 if the consumer has made only low authentication transactions. At block 706, the consumer is requested to provide low authentication, since the consumer has already provided high authentication for past transactions. At block 708, the consumer is requested to provide high authentication since the consumer has not yet provided a high level of authentication in prior transactions.

At block 710, the authentication provided by the consumer is verified. If the consumer cannot be authenticated, the request is terminated, as shown at 714. If the consumers authentication can be verified, the services requested by the consumer are provided, as shown at block 712. Thus, the level of authentication required from the consumer to fulfill requests for account services is based on the consumer's transaction history.

Figure 8:
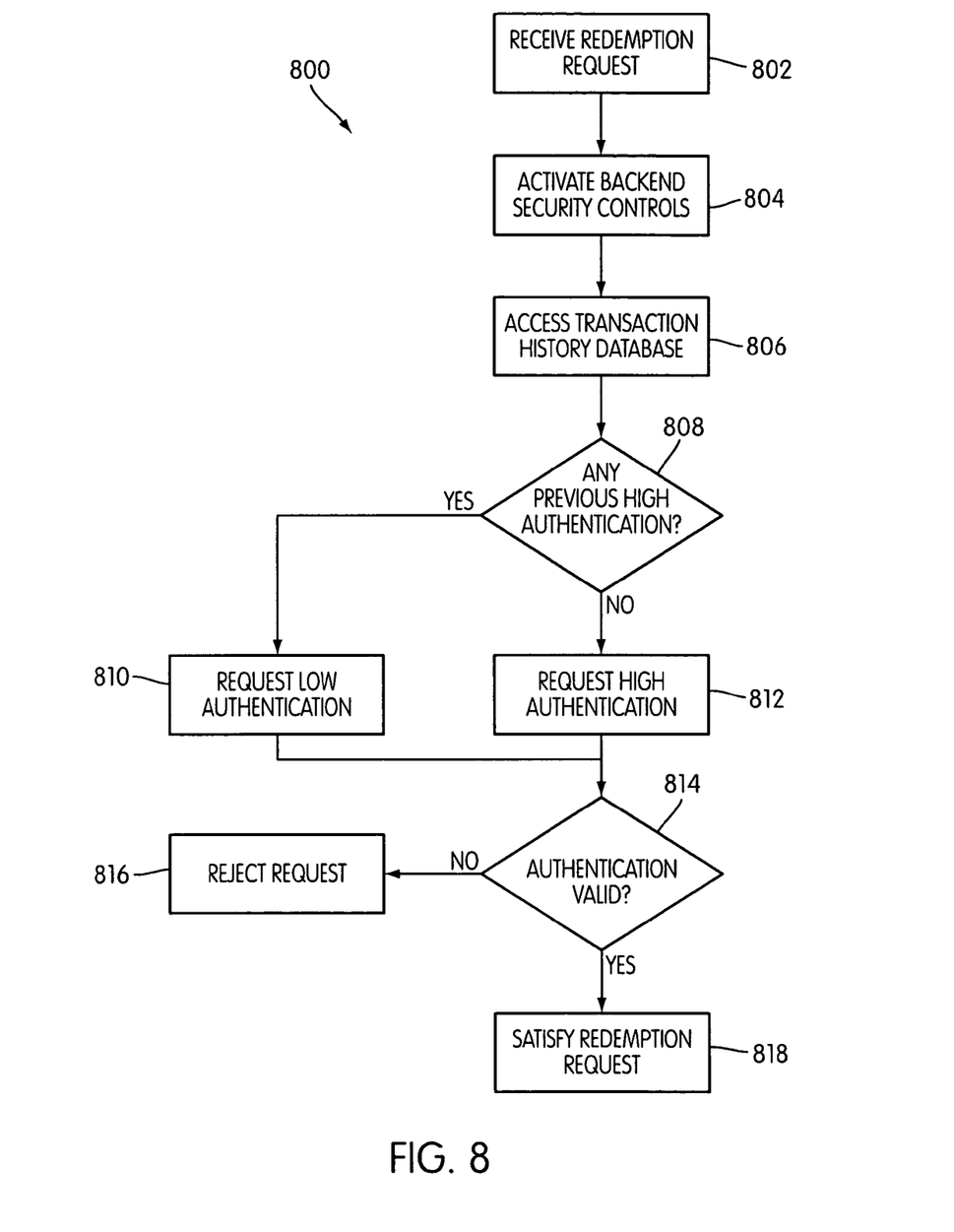
FIG. 8 shows a method for determining consumer authentication requirements during award redemption.

FIG. 8 shows a method 800 for redeeming awards from a promotion system in accordance with the present invention. The method 800 provides a way to differentiate consumer authentication requirements based on consumer transaction history.

At block 802, the promotion system receives a redemption request from a consumer. The consumer wishes to redeem award points that have been earned through participation in prior promotion activity.

At block 804, the promotion system activates back-end security controls. The back-end security controls include, but are not limited to, velocity controls, auto shut-down controls and account consolidation controls. For example, if the redemption velocity is very high, it may be necessary to slow down or shut-down the promotion.

At block 806, the transaction history database is accessed to determine the consumers transaction history. At block 808, the authentication level previously provided by the consumer is checked to see whether a high level of authentication has been provided in prior transactions. If a high authentication level has already been provided by the consumer, the method proceeds to block 810, where only low authentication is requested from the consumer. If a high level of authentication has not been provided by the consumer, the method proceeds to block 812, where high authentication is requested from the consumer.

At block 814, the authentication provided by the consumer is checked for validity. If the authentication provided is not valid, then the method proceeds to block 816 where the redemption request is rejected. If the authentication provided by the consumer is determined to be valid, then the method proceeds to block 818, where the consumer's redemption request may be satisfied.

At block 818, if the consumer's redemption request involves account consolidation, then the account consolidation controls (CTL) would be activated to protect against a situation where the consumer attempts to consolidate fraudulent accounts. For example, the system would check the transaction history of each account involved in the consolidation to see what level of authentication has been previously provided. The system then requests that the consumer provide a high level of authentication for every account where such authentication has not been provided. As a result, the consumer will be required to have provided at one time or another a high level of authentication for every account involved in the account consolidation.

The present invention provides a promotion system that determines consumer authentication requirements based on a consumer transaction history. It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A redemption method for use with a network promotion system that provides awards to consumers for participation in promotion programs, the method comprising the steps of:
   receiving at a client-user device award transaction information describing awards earned by the consumers for participation in the promotion programs of the network promotion system;
   maintaining the award transaction information in a transaction history database of a promotion server device, the promotion server device being communicable with the client-user device over a network;
   receiving a request from a selected consumer using a client-user device to redeem at least a portion of the awards earned by the selected consumer; and
   determining an authentication level required from the selected consumer to redeem the at least a portion of the awards, the authentication level being determined from the award transaction information stored in the transaction history database of the promotion server device.

2. The method of claim 1, wherein the award transaction information includes indications of authentication provided by the consumers.

3. The method of claim 2 wherein the step of receiving comprises the steps of:
   providing at least one promotion program to the consumers, wherein at least one consumer participates in the at least one promotion program;
   authenticating the at least one consumer to determine at least one indication of authentication from the at least one consumer; and
   including the at least one indication of authentication in the award transaction information.

4. The method of claim 1, wherein transaction history database includes indications of authentication associated with the awards earned by the consumers for participation in the promotion programs.

5. The method of claim 4 wherein the authentication level is determined from the indications of authentication maintained in the transaction history database.

6. The method of claim 5, wherein, if the transaction history database indicates that the selected consumer has not provided a high level of authentication, then the authentication level required from the selected consumer will be determined to be the high level of authentication.

7. The method of claim 5, wherein, if the transaction history database indicates that the selected consumer has provided a high level of authentication, then the authentication level required from the selected consumer will be determined to be a low level of authentication.

8. A redemption system for use with a network promotion system, wherein the network promotion system provides awards to consumers for participation in promotion programs, the redemption system comprising:
   a transaction history database for storing award transaction information that describes the awards earned by the consumers for participation in the promotion programs of the network promotion system; and
   a processor coupled to the transaction history database and operable to perform the steps of:
      receiving a request from a selected consumer to redeem at least a portion of the awards earned by the selected consumer that are included in the transaction history database; and
      determining an authentication level required from the selected consumer to redeem the at least a portion of the awards, the authentication level being determined from the award transaction information associated with the selected consumer and maintained in the transaction history database.

9. The redemption system of claim 8, further comprising a receiver coupled to the transaction history database to receive the award transaction information and to store the award transaction information in the transaction history database.

10. The redemption system of claim 9, wherein the award transaction information includes indications of authentication associated with the awards earned by the consumers for participation in the promotion programs.

11. A redemption system for use with a network promotion system, wherein the network promotion system provides awards to consumers for participation in promotion programs, the redemption system comprising:
   means for storing award information in a transaction history database, wherein the award information pertains to the awards earned by the consumers for participation in the promotion programs;
   means for receiving a redemption request from a selected consumer, wherein the selected consumer requests to redeem at least a portion of the awards earned from participation in the promotion programs;
   means for determining from the award information in the transaction history database, an authentication level required from the selected consumer to redeem the at least a portion of the awards.

12. The redemption system of claim 11, wherein, if the transaction history database indicates that the selected consumer has not provided a high level of authentication, then the authentication level required from the selected consumer will be determined to be the high level of authentication.

13. The redemption system of claim 11, wherein, if the transaction history database indicates that the selected consumer has provided a high level of authentication, then the authentication level required from the selected consumer will be determined to be a low level of authentication.

14. The redemption method of claim 1, wherein the network is an intranet, public network, private network, peer-to-peer system, wide area network, local area network, and the Internet.

* * * * *

UNITED STATES PATENT AND TRADEMARK OFFICE
CERTIFICATE OF CORRECTION

| | | |
|---|---|---|
| PATENT NO. | : 7,430,520 B1 | Page 1 of 1 |
| APPLICATION NO. | : 09/637387 | |
| DATED | : September 30, 2008 | |
| INVENTOR(S) | : Haugen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2486 days.

Signed and Sealed this
Eleventh Day of January, 2011

David J. Kappos
*Director of the United States Patent and Trademark Office*